(12) United States Patent
Evrard

(10) Patent No.: US 6,805,548 B1
(45) Date of Patent: Oct. 19, 2004

(54) BLOW-MOLDING MACHINE COMPRISING A CLOSING AND LOCKING MECHANISM

(75) Inventor: Alain Evrard, Le Havre Cedex (FR)

(73) Assignee: SIDEL, Le Havre Cedex (FR)

(*) Notice: Subject to any disclaimer, the term of this patent is extended or adjusted under 35 U.S.C. 154(b) by 0 days.

(21) Appl. No.: 09/959,979

(22) PCT Filed: May 15, 2000

(86) PCT No.: PCT/FR00/01304
§ 371 (c)(1),
(2), (4) Date: Jan. 15, 2002

(87) PCT Pub. No.: WO00/69614
PCT Pub. Date: Nov. 23, 2000

(30) Foreign Application Priority Data

May 17, 1999 (FR) .............................. 99 06316

(51) Int. Cl.⁷ .......................... B29C 49/36; B29C 49/56
(52) U.S. Cl. ...................................... 425/540; 425/541
(58) Field of Search ................................ 425/540, 541

(56) References Cited

U.S. PATENT DOCUMENTS

| 2,854,691 | A | * | 10/1958 | Strong | 425/541 |
| 2,914,799 | A | * | 12/1959 | Canfield | 425/540 |
| 3,402,431 | A | * | 9/1968 | Fogelberg et al. | 425/195 |
| 3,596,315 | A | * | 8/1971 | Yoshikawa et al. | 425/540 |
| 3,685,943 | A | * | 8/1972 | Fischer | 425/541 |
| 3,751,542 | A | * | 8/1973 | Hall | 425/541 |
| 3,854,857 | A | * | 12/1974 | Fischer et al. | 425/541 |
| 3,872,203 | A | * | 3/1975 | Yoshikawa et al. | 425/540 |

FOREIGN PATENT DOCUMENTS

| FR | 2059446 A | * | 5/1971 |
| FR | 2088523 A | * | 1/1972 |
| FR | 2 170 075 A | | 9/1973 |
| FR | 2653058 A | * | 4/1991 |

* cited by examiner

Primary Examiner—Robert B. Davis
(74) Attorney, Agent, or Firm—Sughrue Mion, PLLC

(57) ABSTRACT

The invention relates to a machine for blow-molding thermoplastic products. This type of machine has a molding unit comprising two mobile supports (12), which are hinged in relation to each other and which are controlled by a mechanism comprising a traveling slide (16), between an open position and a closed position. Each support (12) is connected to the slide (12) by at least one associated connecting link (36). The inventive blow-molding machine is characterized in that in its closed position, the main axes of the connecting links (36) are oriented in the same direction, perpendicular to the hinge axis (A1), in such a way that the control mechanism can cause the molding unit to be locked in this closed position.

12 Claims, 4 Drawing Sheets

BLOW-MOLDING MACHINE COMPRISING A CLOSING AND LOCKING MECHANISM

The invention relates to machines for blow-molding plastic products in which a blank of said product is introduced and blow-molded inside a so-called "wrap-over" molding unit.

In said machines, the molding units are comprised of two mold supports where each holds a half mold. The supports are hinged in relation to each other in an open position, making it possible to introduce the blank in the cavity defined by the mold, and in a closed position in which the two half-molds rest against each other by their joint face.

In most cases, the hinge axis of the two supports is contained in the plane of the joint face and extends along one edge of the latter.

Such a mold unit is described for example in the patent application GB-A-1.230.090. In said document we see a mechanism that controls the opening and closing of the mold unit. This mechanism comprises a slide that travels perpendicular to the joint axis of the two supports. The slide is linked to each of the supports by a connecting link that is hinged by one extremity on the slide and by its other extremity on the associated support.

Thus, the two connecting links make it possible to convert a straight slide movement into two opposite support rotary movements.

However, to keep the mold unit in the closed position, the proposed mechanism requires the use of specific means.

Indeed, during the blowing, the air under pressure injected in the product presses the latter against the walls of the cavity. Thus, an effort that tends to cause the opening of the mold unit is transmitted over the two parts of the mold. Yet, in the configuration retained in the previously mentioned document, the connecting links are arranged in such a way that, in the closed position, this opening effort results in an effort on the slide that tends to make it move backwards toward its open position.

The value of this effort can become very significant when the blowing air is injected under an intense pressure, for example under a pressure of 40 bars as is common in blow-molding machines for previously injected blanks.

This effort may on the one hand cause the mold to open, but mostly, and very likely, cause a slight detachment of the two parts of the mold at their joint face. Such a detachment is undesirable as it causes the formation on the finished item of an unsightly added thickness.

We know of various systems used to ensure that the mold unit remains in the closed position. It may be a locking system that makes the two mold supports integral by the edge that is opposite their rotation axis. It may also be means of blocking the slide.

In all cases, said locking means lead to, in addition to their actual presence, the presence of control means adapted so as to allow their implementation in synchronism with the machine's other systems.

Therefore, the objective of the invention is to propose a new control mechanism for the opening and closing of the mold unit that makes it possible to eliminate the presence of specific locking means, even for machines that use a significant blowing pressure.

With this end in view, the invention proposes a machine for blow molding thermoplastic products, of the type in which a mold unit comprises a mold in two parts each carried by a mobile support, of the type in which the two mobile supports are hinged in relation to each other, of the type in which the movements of the two supports, between an open position and a closed position, are controlled by a mechanism that comprises a slide that travels between an opening position and a closing position, and of the type in which each support is connected to the slide by at least one associated connecting link that is hinged on the one hand on the slide and on the other hand on said support, characterized in that, in the closed position, the main axes of the connecting links, that are each determined as being one common perpendicular to the hinge axes of the connecting link on the slide and on the associated support, are oriented in one same direction perpendicular to the hinge axis so that the control mechanism ensures the locking of the molding unit in the closed position.

According to other characteristics of the invention:
- in the closed position, the main axes of the connecting links are oriented in one same direction perpendicular to a joint face of the mold parts;
- in the closed position, the main axes of the connecting links are oriented in one same direction perpendicular to the translation direction of the slide;
- in the closed position, the main axes of two connecting links respectively associated to each of the supports are aligned;
- at least one of the two supports comprises several associated connecting links;
- the slide comprises at least one stirrup with two arms that extend noticeably in a plane that is perpendicular to the hinge axis of the two supports and that, in the closed position, surround at least partially the two supports, and the connecting links are hinged to the free extremities of the two arms and are solicited during compression to ensure the locking of the mold unit;
- the slide comprises two stirrups offset in relation to the axial hinge direction of the two supports, so that each support is associated to at least two connecting links offset in relation to the axial direction;
- the slide is controlled by a jack;
- the mold unit is integral with a carousel with a continuous rotary movement, and the slide is controlled by a device with a cam and a cam follower;
- the slide is solicited by the cam from its closing position towards its opening position, towards an elastic device that continuously solicits it in the direction of its closing position;
- the elastic device is comprised of a jack;
- during the opening of the mold, the jack exerts a reduced closing effort on the slide;
- the jack is a double-acting jack comprising two chambers with a variable volume delimited by a piston and that have different effective sections on the piston so that, when the two chambers are fed with fluid under an identical pressure, one of the chambers exerts on the jack, a force that is greater than that of the other, which tends to solicit the slide toward its closing position; and
- the traveling direction of the slide and the hinge axis of the two supports are perpendicular to each other and are contained in a plane that contains the joint face of the mold.

Other characteristics and advantages of the invention will become apparent upon reading the following detailed description as well as from the attached drawings in which.

The blow-molding machine as set forth in the invention can be an extrusion blow-molding machine, in which the container blank is a tubular plastic parison coming from an extruder, or a blow-molding machine for previously injected blanks. The invention will find an application in machines for the manufacture of polyethylene terephthalate (PET) containers in which the blowing of the container takes place at a pressure of approximately 40 bars. It will also find an application in machines equipped with a pressure compensation system interposed between one of the half molds and the associated support. Indeed, said means of compensation, generally at line pressure, make it possible to avoid any detachment of the half-molds during the blowing but they increase the effort exerted on the supports in the direction of their opening during the blowing.

The blow-molding unit 10 that is illustrated in the figures comprises two mold supports 12 each intended to hold a half-mold (not represented). In the example shown, the supports are more or less in the shape of a half tube so as to receive semi-cylindrical half-molds.

Figure 1:
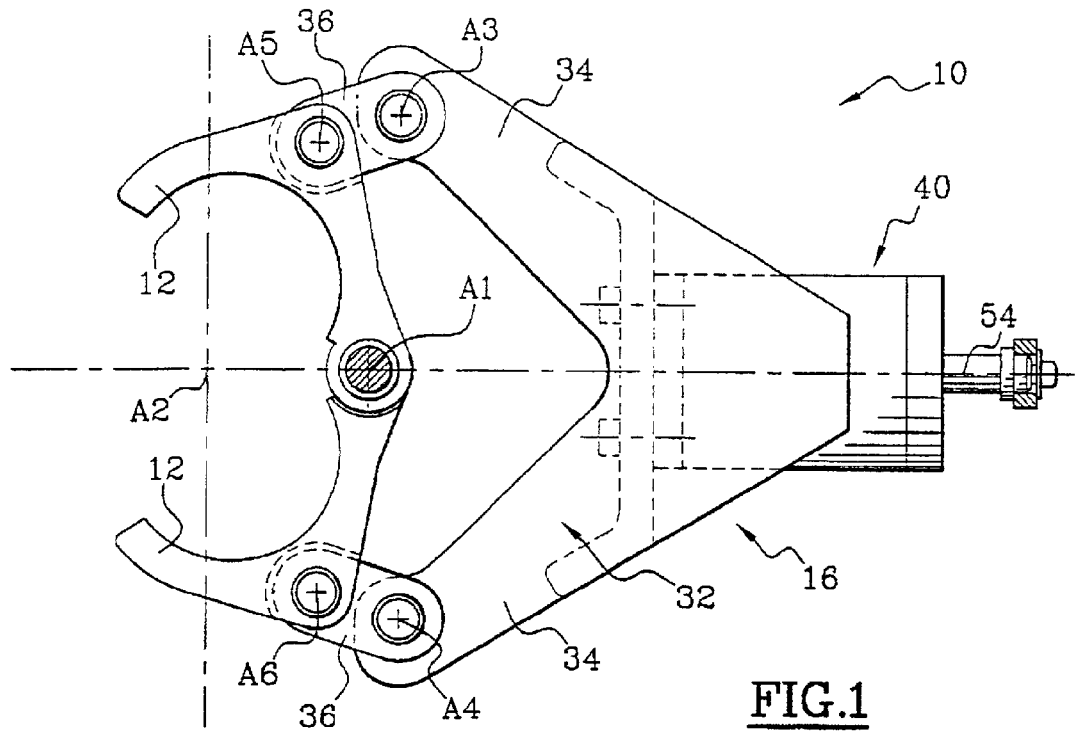
FIG. 1 is a schematic view of the molding unit according to the axial direction of the hinge axis of the mold supports, where the unit represented is in the open position.
Figure 2:
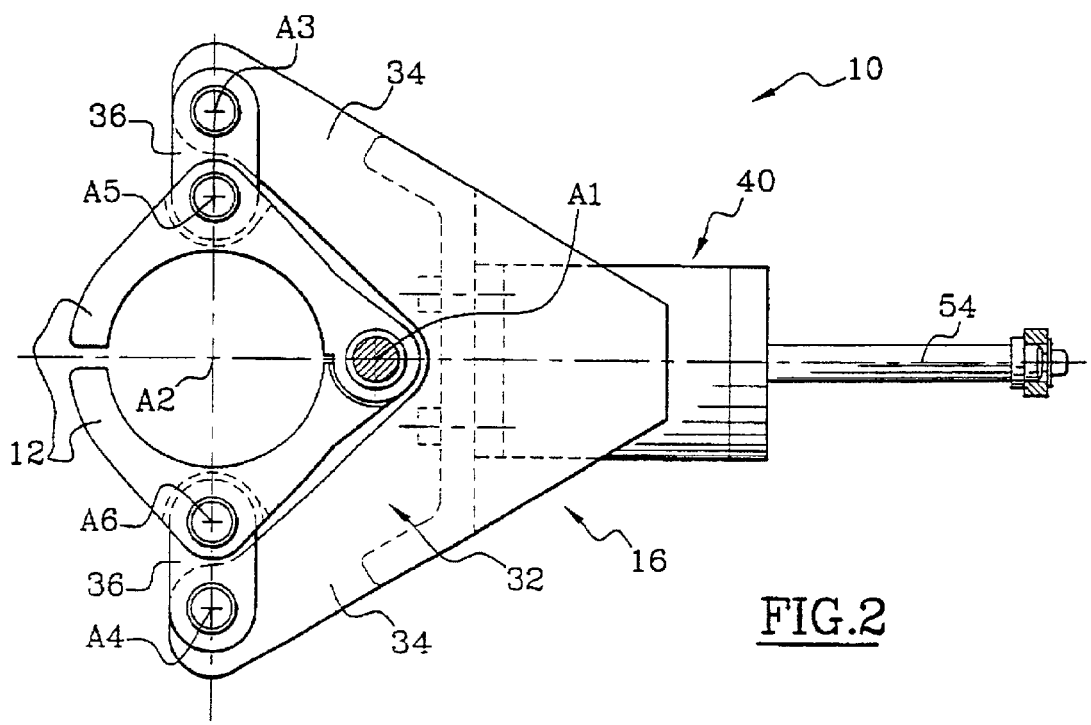
FIG. 2 is a view similar to that of FIG. 1 in which the unit represented is in the closed position.

The two supports 12 are hinged by a common axial edge on a frame 14 between an open position illustrated in FIG. 1 and a closed position illustrated in FIG. 2. In the closed position, the supports 12 define an internal space that is more or less cylindrical so that, when each in holding the associated half-mold, the latter rest against each other by the planes of their respective face joints. Conversely, in the open position, the two half-molds are separated from each other to as to be able to introduce a container blank inside the cavity they delimit in the closed position.

In the example shown, the molding unit is mounted on a carousel machine, where the frame 14 is integral with a rotor (not represented) that is driven in rotation around its axis. The rotor generally comprises several identical molding units distributed angularly around the rotation axis.

To make the text easier to understand, without however restricting the scope of the invention, we will put ourselves in the case where the frame 14 is oriented in relation to a radial plane of the rotor, where the supports are hinged to the external radial extremity of the frame, around an axis A1 parallel to the rotation axis of the rotor. In the case of a simple mold with a face joint that is actually contained in a plane, the latter will therefore be a radial plane of the rotor. In the open position, the mold is therefore opened radially toward the outside and the container blank can be inserted between the two half-molds either following an axis A2 of the mold, or following a direction oriented more or less radially from the outside to the inside. Also, we will agree that the hinge axis of the supports and that of the rotation of the rotor are vertical.

Therefore, with this arrangement, the opening of the molding unit occurs by radially pulling the supports 12 toward the inside.

Figure 3:
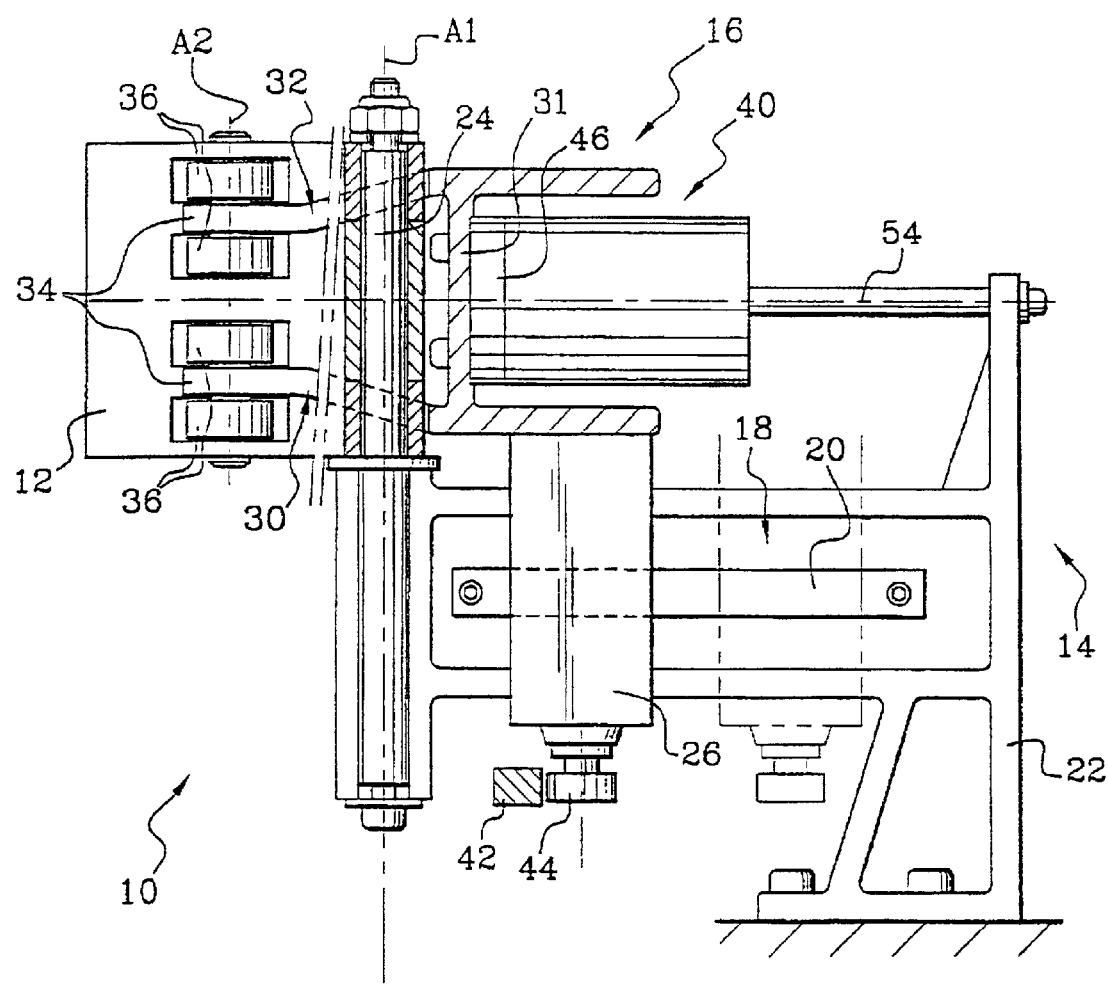
FIG. 3 is a schematic side view with a partial cut of the mold unit.

To do so, the molding unit comprises a slide 16 that travels on the frame along to a radial direction between a pushed-back opening position and a pushed-forward closing position illustrated in solid lines in FIG. 3.

Figure 4:
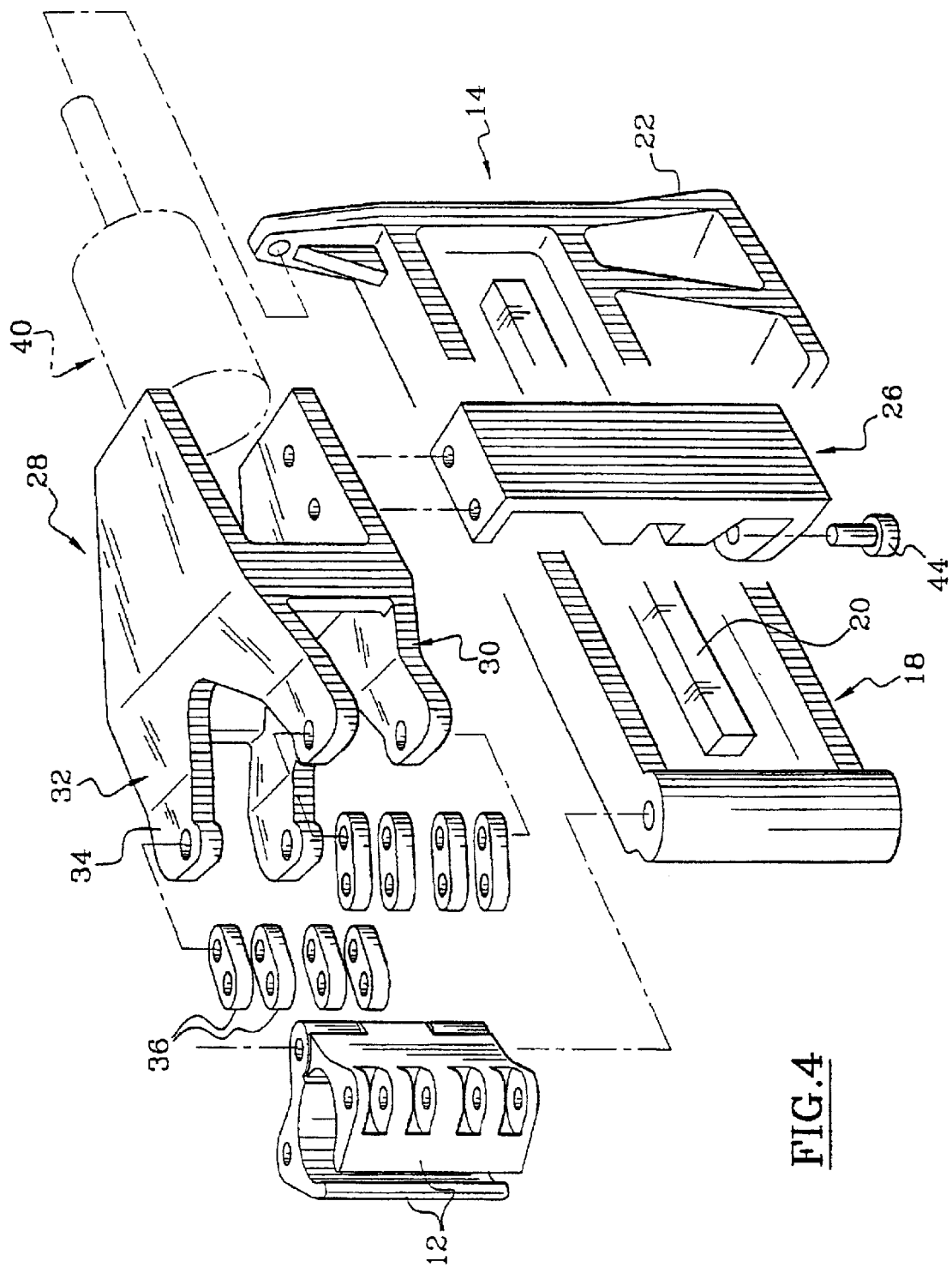
FIG. 4 is a perspective cutaway view of the mold unit.
Figure 5:
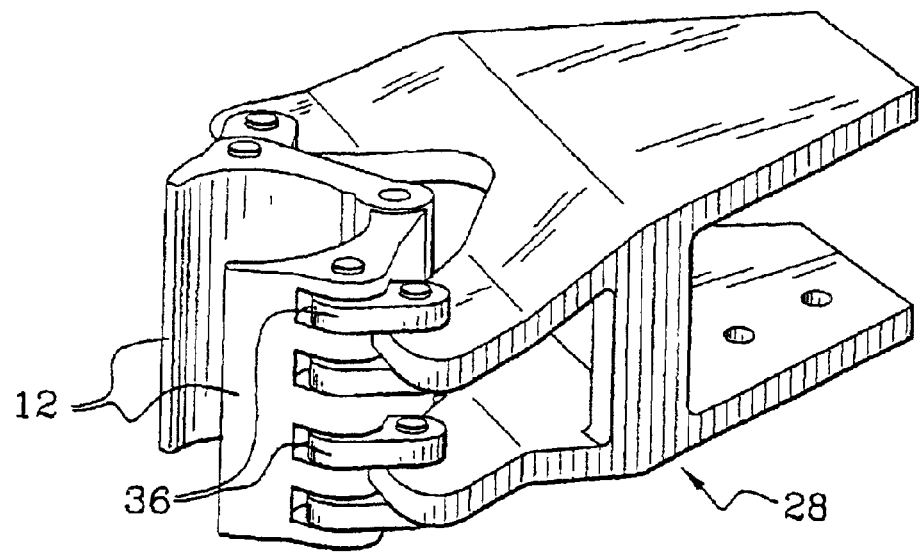
FIG. 5 is a perspective view of the mold unit.

In FIGS. 3 and 4, we can see that the frame 14 comprises a radial crossbar 18 equipped, on one side, with a rail 20 on which travels the slide 16. This crossbar 18 has, at its internal radial extremity, a foot 22 of which an inside part attaches to the machine's rotor. At its external radial extremity, the crossbar carries the hinge shaft 24 of axis A1 of the supports 12, which are arranged above the level on the crossbar 18.

The slide 16 comprises for the most part a carriage 26 that travels along the rail 20, on the side of the crossbar 18, and an upper clevis 28 that is attached to the carriage and moves above the crossbar 18. The upper clevis 28 comprises two plates, lower 30 and upper 32 that, when seen from above, each have the shape of a stirrup in the form of a V radially open toward the outside. Each stirrup 30, 32 extends more or less according to a horizontal plane perpendicular to the hinge axis A1 of the two supports 12 and therefore it comprises arms 24 that extend radially toward the outside and that, at least in the closed position, surround the two supports 12. The two stirrups 30, 32 are axially superposed and are connected to each other by a vertical wall 31, perpendicular to the radial direction.

The extremity of each of the arms of the two stirrups is connected, by two parallel connecting links 36, to the closest support. Each connecting link is therefore hinged on the one hand around a vertical axis A3, A4 on the extremity of a stirrup's arm 34, and on the other hand on the associated support 12 around a vertical axis A5, A6.

Of course, the four connecting links associated to two superposed arms of the two stirrups 30, 32 are all hinged on the same support 12, around the same axis A5 or A6. The mechanism thus created is equivalent to a system that only comprises one stirrup of which each arm would only be equipped with one connecting link, but is has the advantage of better distributing the efforts transmitted between the slide and the supports.

Therefore, each connecting link 36 has a main action axis, which is the common perpendicular to its two hinge axes A3 and A5, or A4 and A6.

In accordance with the teachings of the invention, in the closed position of the molding unit, the main action axes of the connecting links 36 are all more or less oriented in the same direction. In this way, the efforts exerted on the slide 16 by the supports 12 fully offset and annul each other.

Preferably, as in the device illustrated in the figures, the orientation of the connecting links 36 is more or less perpendicular to the joint face of the two semi-molds so as to obtain optimal tightening action.

In addition, we can see that, in the closed position, the orientation of the connecting links is perpendicular to the radial traveling direction of the slide 16. Thus, the arrangement of the mechanism illustrated in the figures is such that, in the closed position, the axes A2 through A6 are all more or less contained in one same vertical plane perpendicular to the radial traveling direction of the slide 16.

According to the invention, the stirrups 30, 32 and the connecting links 36 are sized so that, in the closed position, the mechanism solicits the half-molds that rest against each other with significant force, where the connecting links 36 are solicited in compression and the stirrups 30, 32 are subjected to a spreading effort. Yet, thanks to the invention, the spreading effort that is exerted on the arts of each stirrup is symmetrical and perpendicular to the traveling direction, so that the tightening effort of the two half-molds does not result in any significant effort that tends to make the slide 16 move frontward to backward.

Also, this device as set forth in the invention makes it possible to obtain a particularly significant tightening effort from the two half-molds, without the need to provide a lot of energy to the slide because, when arriving in the closed position, the orientation of the connecting links is such that the reduction ratio between the radial movement of the slide and the tangential movement of the two supports is very significant. Yet, the tightening effort only intervenes during the very last part of the slide's 16 trajectory toward its closed position, meaning when the gearing down is the most favorable.

Thus, the mechanism that ensures the opening and closing movement of the molding unit also ensure the locking function in the closed position.

We will note that the connecting links 36 are hinged on the supports at the level of a median plane that is a vertical symmetry plane of each of the two supports 12, so that the pushing effort exerted by the connecting links 36 on each support is distributed evenly, which makes it possible to obtain a homogenous tightening force at the level of the joint face of the mold.

In the machine that is illustrated, the slide 16 is moved between its forward and its pulled-back by a device that combines on the one hand a double acting jack 40 and on the other hand a device with a cam 42 and a cam follower 44.

The jack 40, for example a pneumatic jack, thus comprise a cylindrical body 46 that is attached to the rear face of the vertical wall 31 of the clevis 28 that connects the two stirrups 30, 32. The jack 40 is arranged above the crossbar 18 and is oriented radially in relation to the machine's rotor. As can be seen on the drawing of FIG. 6, the jack 40 comprises a piston 48 that demarcates in the body 46 two chambers of variable volume, internal 50 and external 52. Of course, the piston 48 comprises a rod 54 that extends radially toward the inside to attach to the upper extremity of the foot 22. Thus, the piston 48 is always at the same distance from the rotor's rotation axis, whereas the body 46 of the jack is likely to follow the redial movements of the slide 16.

In this way, when the internal chamber 50 of the cylinder is fed in fluid under pressure, the jack 40 solicits the slide 16 toward its opening position, pulled back toward the inside. Conversely, when the external chamber 52 is fed, the slide 16 is commanded radially toward the outside toward its closing position of the molding unit. If the two chambers are fed at the same pressure, the presence of the rod 54 through the internal chamber, which reduces the useful section of this chamber, implies that the jack is soliciting the slide 16 toward its forward closing position. This residual effort is of course weak, but it is not insignificant.

On the other hand, in the context of a molding unit installed on a carousel machine, we can see from the figures that the carriage 26, carries, at its lower extremity, a roller 44 that is mounted in rotation around a vertical axis and is meant to cooperate with a cam 42 that is arranged on a part of the rotor's periphery, but that is fixed.

The cam 42 is radially arranged on the outside in relation to the roller 44. Thus, it comprises a central circular section 56 whose axis it merged with that of the rotor and has a radius R1. On each side of the rotor, is provided an insertion section 58 and a release section 60. The insertion section 58 is located before the central section 56 on the rotor's trajectory and therefore, before the roller 44, and is provided to radially bring the roller 44 toward the inside from a radius R2 that is greater than the radius R1 and corresponds to the forward opening position of the slide, up to the radius R1 that corresponds to the closing position of the slide.

Figure 6:
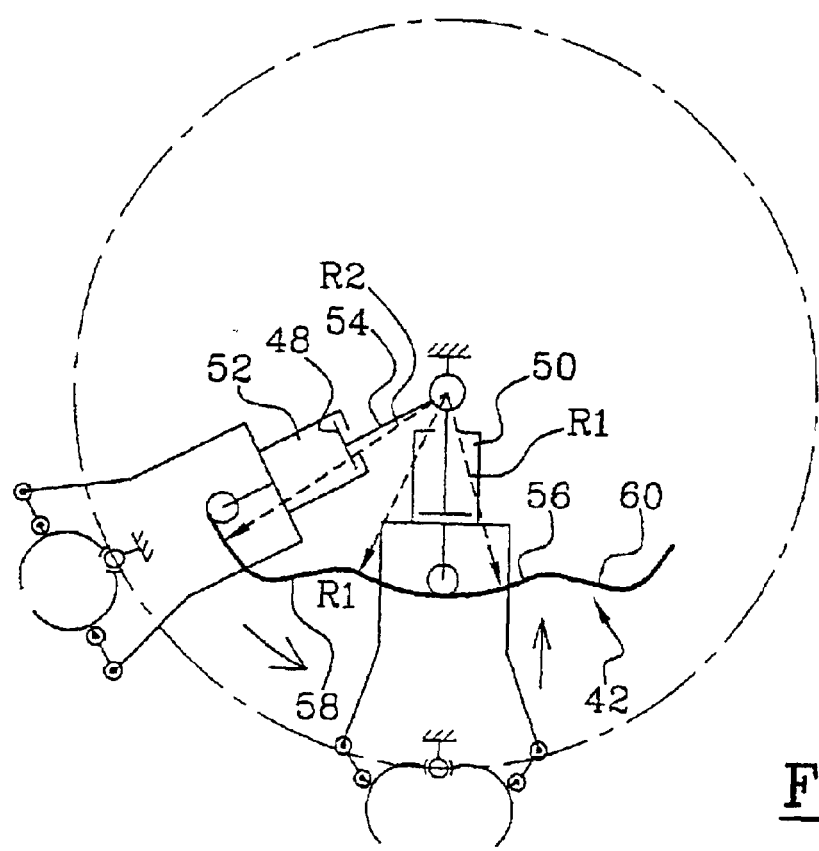
FIG. 6 is a diagram that illustrates the operation of the mechanism as set forth in the invention.

As seen on FIG. 6, the cam 42 in whole only extends over approximately 90° around the rotation axis of the rotor.

The operation of the system will now be described based on the angular position of the mold unit in question around the rotation axis of the rotor.

When the mold unit being considered is not opposite the cam 42, only the external chamber 52 is fed in fluid under pressure. This way, the slide 16 is pushed toward the outside to cause the tightening of the two half-molds against each other. Preferably, the mechanism is sized so that the tightening effort blocks the overall mechanism just before reaching the aligned arrangement of the connecting links that is illustrated in FIG. 2. In this way, possible wear and tear space in the hinges will not be detrimental to the good operation of the mechanism as the connecting links will not exceed this balanced position.

Just before the blow-molding unit arrives opposite the cam 42, both chambers are fed with fluid under the same pressure. Thus when the roller 44 comes in contact with the insertion section 58 of the cam 42, the effort exerted by the jack 40 is sufficiently weak to allow the cam to push the slide toward the inside without causing any noticeable jolts. The compression of the air contained in the external chamber 52 is such that the jack continues to exert a certain effort on the slide, which makes it possible to press the roller 44 without having it bounce.

Thus, the cam 52 and roller 44 system makes it possible to determine exactly the time of opening of the mold, and this in perfect coordination with the blow-molding process whose advancement is generally tied directly to the angular position of the molding unit around the rotor's axis.

When the roller 54 reached the central section 56 of the cam, the slide has reached is most pushed back position and the mold unit is completely open. We will note that the jack continues to press the roller 44 on the cam, which makes it possible to have a perfectly defined opening position at each cycle.

When the roller 44 approaches the release section 60 of the cam 42, we can for example keep a fluid pressure that is identical in both chambers 50, 52 of the jack 40. Thus, the effort exerted by the jack is sufficient for the slide to be radially brought back toward the outside when the roller 44 follows the release section 60, but the closing movement of the molding unit that results therefrom occurs without any excessive effort, in a smooth manner.

When the roller 44 has gone beyond the end of release section 60, the molding unit is then in a closing position and it is then possible to feed only the external radial chamber 52 of the jack 40 to avoid any recoil of the jack 40.

Of course, the invention can also be implemented by using other means for controlling the slide 16. We could for example foresee the use of a single jack or only use a cam system.

What is claimed is:

1. Machine for blow-molding thermoplastic products, of the type in which a molding unit (10) comprises a mold made of two parts where each is carried by a mobile support (12), of the type in which the two mobile supports (12) are hinged in relation to each other, of the type in which the movements of the two supports (12), between an open position and a closed position, are controlled by a mechanism that comprises a traveling slide (16) between an opening position and a closing position, of the type in which each support (12) is connected to the slide (16) by at least one associated connecting link (36) that is hinged on the one hand to the slide (16) and the other hand to said support (12), of the type in which, in the closed position, the main axes of the connecting links (36), which are each determined as being a common perpendicular to the hinge axes of the connecting link (36) on the slide (16) and on the associated support (12) are oriented in a same direction perpendicular to the hinge axis (A1) and perpendicular to a joint face of the mold parts, so that the control mechanism ensures the locking of the molding unit in the closed position, characterized by the fact that, in the closed position, the main axes of the connecting links (36) are arranged in a median plane of the part of the mold that is carried by the associated support, and characterized by the fact that the molding unit (10) is integral with a carousel with a continuous rotation movement, and by the fact that the slide (16) is controlled by a device with a cam (42) and a cam follower (44).

2. Blow-molding machine as set forth in claim 1, characterized by the fact that, in the closed position, the main axes of the connecting links (36) are oriented following a same direction perpendicular to traveling direction of the slide (16).

3. Blow-molding machine as set forth in claim 1, characterized by the fact that, in the closed position, the main axes of the two connecting links (36) respectively associated to each of the supports (12) are aligned.

4. Blow-molding machine as set forth in claim 1, characterized by the fat that at least one of the two supports (12) comprises several associated connecting links (36).

5. Blow-molding machine as set forth in claim 1, characterized by the fact that the slide (16) comprises at least one stirrup (30, 32) with two arms (34) that extend more or less in a plane that is perpendicular to the hinge axis (A1) of the two supports (12) and that, in the closed position, at least partially surround the two supports (12), and by the fact that the connecting links (36) are hinged to the free extremities of the two arms (34) and are solicited in compression to ensure the locking of the molding unit.

6. Blow-molding machine as set forth in claim 5, characterized by the fact that the slide (16) comprises two stirrups (30, 32) offset in relation to the axial hinge direction of the two supports, so that each support is associated to at least two connecting links (36) offset in relation to the axial direction.

7. Blow-molding machine as set forth in claim 1, characterized by the fact that the slide (16) is controlled by a jack (40).

8. Blow-molding machine as set forth in claim 1, characterized by the fact that the slide (16) is solicited by the cam (42) from its closing position toward its opening position, toward an elastic device that continuously solicits it in the direction of its closing position.

9. Blow-molding machine as set forth in claim 8, characterized by the fact that the elastic device is comprised of a jack (40).

10. Blow-molding machine as set forth in claim 9, characterized by the fact that, during the opening of the mold, the jack (40) exerts a reduced closing effort on the slide (16).

11. Blow-molding machine as set forth in claim 10, characterized by the fact that the jack (40) is a double-acting jack that comprises two variable volume chambers (50, 52) delimited by a piston (48) and with different effective sections of the piston so that, when the two chambers are fed with a fluid under identical pressure, one of the chambers (52) exerts a force greater than the other (50) on the piston (48) which tends to solicit the slide (16) toward its closing position.

12. Blow-molding machine as set forth in claim 1, characterized by the fact that the travel direction of the slide (16) and the hinge axis (A1) of the two supports (12) are perpendicular to each other and are contained in a plane that contains joint face of the mold.

* * * * *